United States Patent
Strahl et al.

(10) Patent No.: US 7,519,636 B2
(45) Date of Patent: Apr. 14, 2009

(54) KEY SEQUENCED CLUSTERED I/O IN A DATABASE MANAGEMENT SYSTEM

(75) Inventors: Torsten Strahl, Berlin (DE); Henrik Hempelmann, Havelberg (DE)

(73) Assignee: SAP AG, Walldorf (DE)

( * ) Notice: Subject to any disclaimer, the term of this patent is extended or adjusted under 35 U.S.C. 154(b) by 449 days.

(21) Appl. No.: 11/093,677

(22) Filed: Mar. 30, 2005

(65) Prior Publication Data

US 2006/0230085 A1 Oct. 12, 2006

(51) Int. Cl.
*G06F 17/30* (2006.01)
(52) U.S. Cl. .................. 707/205; 707/200; 707/206; 711/200
(58) Field of Classification Search ........... None
See application file for complete search history.

(56) References Cited

U.S. PATENT DOCUMENTS

| | | | | |
|---|---|---|---|---|
| 5,729,710 | A * | 3/1998 | Magee et al. | 711/203 |
| 5,794,228 | A * | 8/1998 | French et al. | 707/2 |
| 5,832,508 | A * | 11/1998 | Sherman et al. | 707/200 |
| 7,164,991 | B1 * | 1/2007 | Toyoda et al. | 702/19 |
| 2002/0048046 | A1 * | 4/2002 | Unno | 358/1.16 |
| 2004/0267835 | A1 * | 12/2004 | Zwilling et al. | 707/202 |

* cited by examiner

*Primary Examiner*—Charles Rones
*Assistant Examiner*—Noosha Arjomandi
(74) *Attorney, Agent, or Firm*—Buckley, Maschoff & Talwalkar LLC

(57) ABSTRACT

A system, method, apparatus, means and computer program code for writing data includes identifying a plurality of pages to be written to a data volume, each page including a file identifier and a key, creating a first page group from the plurality of pages, the first page group including pages associated with a first file as identified by the file identifier and sorted by the key; and writing the first page group to the data volume.

12 Claims, 5 Drawing Sheets

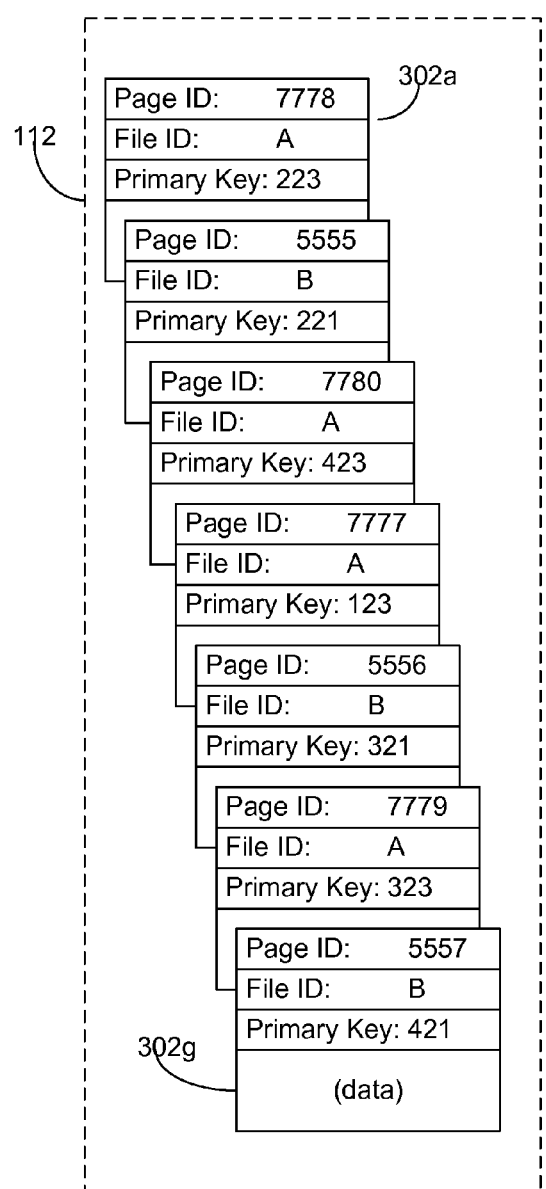
FIG. 3A
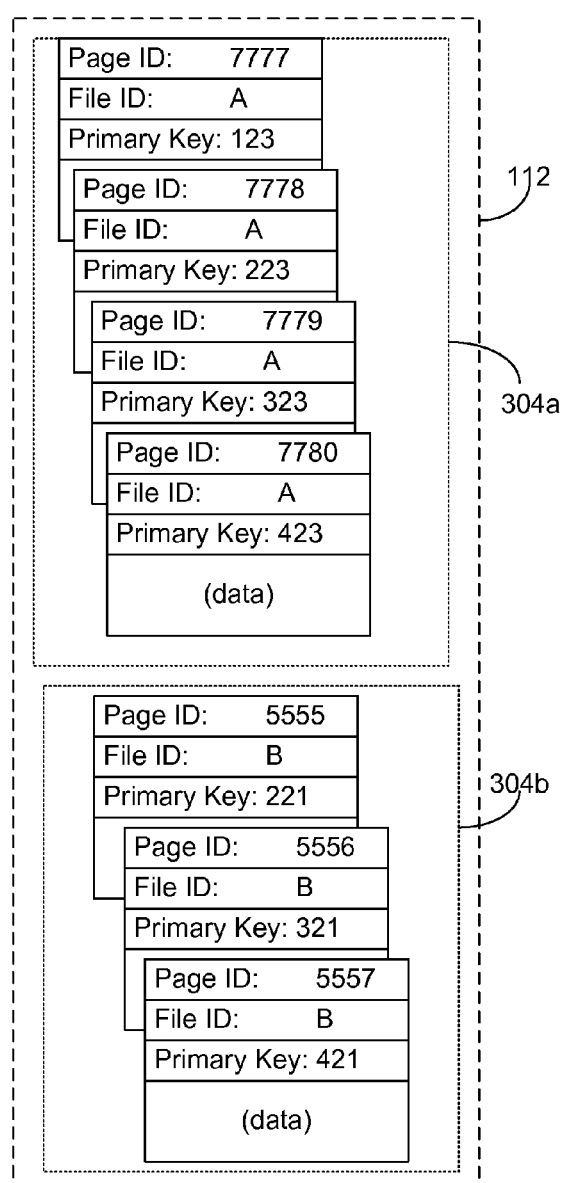
FIG. 3B
FIG. 3

US 7,519,636 B2

KEY SEQUENCED CLUSTERED I/O IN A DATABASE MANAGEMENT SYSTEM

FIELD

Embodiments of the present invention relate to database systems. More specifically, some embodiments relate to systems and methods for managing data in a database system.

BACKGROUND

Database systems are widely used for a number of applications. Generally, the applications demand data integrity and consistency. That is, the database systems are relied upon by applications to accurately and efficiently store and retrieve data.

Some database systems use data caches to assist in updating, modifying and otherwise manipulating data before committing the modified data to the database. The database may be stored in a data area on one or more data volumes. When data from the database is modified, the portion of the database affected by the modification needs to be written from the data cache to the data area. Some database systems cause the modified data in the data cache to be written to the data area when the data cache becomes full or on a regular timed basis (e.g., such as once every few minutes). Unfortunately, it is difficult to efficiently write the modified data to the data area in a way that allows the data to later be efficiently read from the data area.

For example, one way to efficiently write data from the cache to the data store is to sequentially flush the cache and write modified data to the first free storage blocks available in the data volumes. While this provides for an efficient and effective way to write the data, it can make it difficult to later read the data from the data volumes, at least because each of the data pages of a database may be randomly scattered over the data volumes. Such scattering can require a large number of disk seeks to retrieve data from different pages.

It would be desirable to provide improved systems and methods for writing modified data from a cache to a data volume in a database system.

SUMMARY

Pursuant to some embodiments, a system, method, apparatus, means and computer program code for writing data include identifying a plurality of pages to be written to a data volume, each page including a file identifier and a key, creating a first page group from the plurality of pages, the first page group including pages associated with a first file as identified by the file identifier and sorted by the key, and writing the first page group to the data volume. In some embodiments, a number of page groups are written from a data cache to a data volume. In some embodiments, the writing of the page groups includes identifying an available disk cluster large enough to accommodate a page group.

Pursuant to some embodiments, a system, method, apparatus, means and computer program code are provided which include monitoring a data volume associated with a database system to identify a newly available block, determining if the newly available block is adjacent to an existing cluster consisting of one or more blocks, adding the newly available block to one of the existing cluster or a new cluster based on the outcome of the determining, and updating a list of available clusters to reflect the adding of the newly available block.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 3 is an illustration of a data cache and data pages before and after sorting pursuant to some embodiments.

DETAILED DESCRIPTION

To alleviate problems inherent in the art, embodiments of the present invention introduce systems, methods, computer program code and means for improved writing of data to a database. Pursuant to some embodiments, reading of the data from the database is improved as the data is written in sorted and organized clusters or groups. For convenience, clarity and ease of exposition, a number of terms are used herein. For example, the term "server" is used to refer to software configured to perform tasks in response to requests from a "client". One or more servers may be implemented on a given computing device. Other terms will be introduced below.

For the purposes of illustration, but not limitation, a particular type of database system will be used to describe certain features of embodiments. More particularly, a relational database management system will be described, although those skilled in the art will recognize that the techniques and embodiments described herein may be implemented with desirable results in other types of database systems.

Figure 1:
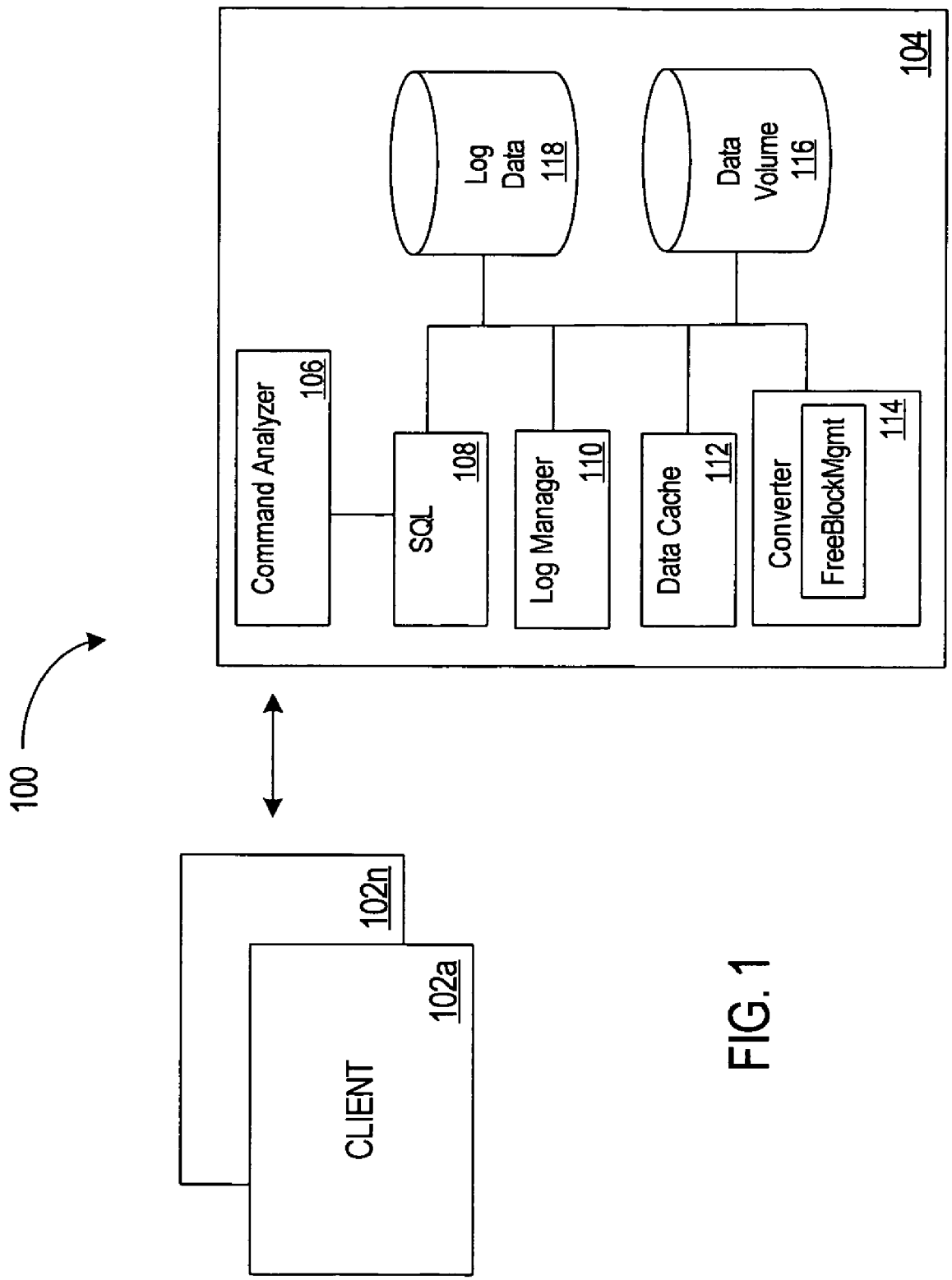
FIG. 1 is a diagram of a system according to some embodiments.

To illustrate features of some embodiments of the present invention, reference is first made to FIG. 1 where an illustrative database system 100 is shown. For simplicity, only several components of database system 100 are shown in FIG. 1; those skilled in the art will appreciate that a database system typically may include a number of other components including, for example, I/O devices, drivers, APIs, and the like. Database system 100 may be, for example, a structured query language ("SQL") database system. For the purpose of illustration, but not limitation, database server 104 may be the MaxDB® system offered by mySQL AB and SAP AG of Walldorf Germany.

Database system 100 includes one or more client devices 102 interacting with a database server 104. For example, each client device 102 includes software configured to allow one or more users or applications to interact with database server 104 to submit queries and receive database responses. As a simple example, client 102 may be a computing device (such as a personal computer) operating Internet browser software (such as Microsoft's Internet Explorer®) to interact with database server 104 over a network connection by submitting SQL queries to database server 104 and by receiving responses from the database server 104.

While the system 100 of FIG. 1 only shows two client devices 102 and a single database server 104, those skilled in the art will recognize that database system 100 may include any number of clients interacting with one or more database servers. Further, for the purpose of illustration but not limitation, some or all of the client devices 102 and database server 104 may be implemented on computing devices such as, for example, computing devices implemented with Intel® x86 processors running a version of Microsoft Windows® or LINUX.

Database server 104 may consist of a number of elements (some of which are shown) interacting to create databases, store data, and respond to queries, including, for example, a command analyzer 106, a SQL component 108, a log manager 110, a data cache 112, a converter 114, a data volume 116 and a data log 118. In general, database server 104 receives a database request from client 102 and responds to the request. Command analyzer 106 operates to analyze requests to identify the specific database interactions to be taken and passes SQL commands to SQL system 108 for application to data stored in data volume 116. Data volume 116 may consist of one or more devices or components (e.g., such as an array of mass storage devices).

Frequently, SQL commands received by database server 104 will require modification of data stored in (or to be added to) a database. When information from the database is to be modified, the data is retrieved from data volume 116 and manipulated in data cache 112. To increase the speed of manipulation of data, data cache 112 may be implemented using volatile memory such as random access memory (RAM) of the server. Once the data manipulation is complete (or after a series of manipulations has completed), the modified data is written from (or "committed") data cache 112 to data volume 116 to update the database. Embodiments of the present invention allow this writing to be performed efficiently and in a manner that enables the data to be read back efficiently as well. Further, a log entry may be written in data log 118 (e.g., to allow the database to be restored to a consistent state if an error occurs).

In the context of the illustrative example where the database system is a relational database system, several terms will be used to describe features of some embodiments. A relational database management system organizes data in two-dimensional "tables", each having one or more "rows" and "columns". Each row is assigned a "primary key" (or some other internally assigned system key, both of which will be generally referred to herein as a "primary key" or simply, a "key").

A number of rows, ordered in key sequence, are stored in fixed size "pages" (for example, in the MaxDB system, pages are each 8 kbytes in size) in data volume 116. A number of pages from the same table are referred to as a "file". In the example system, each of the pages of a file are organized in a b*tree, with the data pages in leaf level "0" and ordered by key sequence (those skilled in the art will appreciate that other organization techniques may be used).

When a new page is created, the page is assigned a unique identifier or "page identifier" or "page ID". All page accesses are addressed using this page ID. Pages are written to "blocks" of the same size on the attached data volumes. The "data area" is equal to the sum or entirety of all area designated for the database system in the attached data volumes 116. The data volumes 116 may be, for example, any of a number of different types of mass storage devices, including for example, magnetic media or the like.

Pursuant to some embodiments, when data (on a page) is modified, the page(s) to be modified are read into the data cache 112 and the data is updated. A log entry may be written to the log data 118 (to allow recovery in the event of an error). When a number of modified pages in data cache 112 exceeds a predefined threshold (or after a predetermined time period passes), all of the modified pages are written back to the data volumes 116.

Pursuant to some embodiments, the modified data pages are not rewritten to their original locations; instead, modified data pages are written to new free blocks on in the data volumes 116. This results in two instances of the data page on the volume: the "last known good" page and the updated page. In case of a recovery of a crashed database, the updated pages are ignored, and the "last known good" pages are used instead. Database content is then reconstructed by redoing all of the log entries. As mentioned above, periodically (e.g., every few minutes), a synchronization of log data 118 and data volumes 116 are performed. All modified data pages are flushed to the data volumes 116 and marked as the "last known good" version. This point in time is marked as a "savepoint", and is written to log data 118. The blocks on the data volumes 116 which contained the previous (and now superceded) "last known good" pages are marked as free and ready for a reassignment.

Converter 114 is used to store the current mapping between the page IDs and the block addresses of the individual data volumes 116. Pursuant to some embodiments, to ensure ready recovery in the event of an error, converter 114 maps the addresses of both the "last known good" page data and the updated page. Converter 114 may also store information identifying the blocks which are now free and ready for a reassignment. In some embodiments, a subcomponent of converter 114 (referred to in FIG. 1 as the "FreeBlockMgmt" subcomponent), is used to identify free and used blocks as well as to assemble adjacent blocks into clusters as described further below. For simplicity, the FreeBlockMgmt subcomponent will be referred to simply as the "converter" below. Those skilled in the art will appreciate that other subcomponents or modules may be used to implement certain functions as described herein.

Pursuant to some embodiments, the modified pages are grouped and sorted (as discussed further below) before they are written back to the data volumes 116. Applicants have discovered that this grouping and sorting allow pages to be efficiently written to appropriate locations. Further, the pages may then be read back with improved efficiency.

Figure 2:
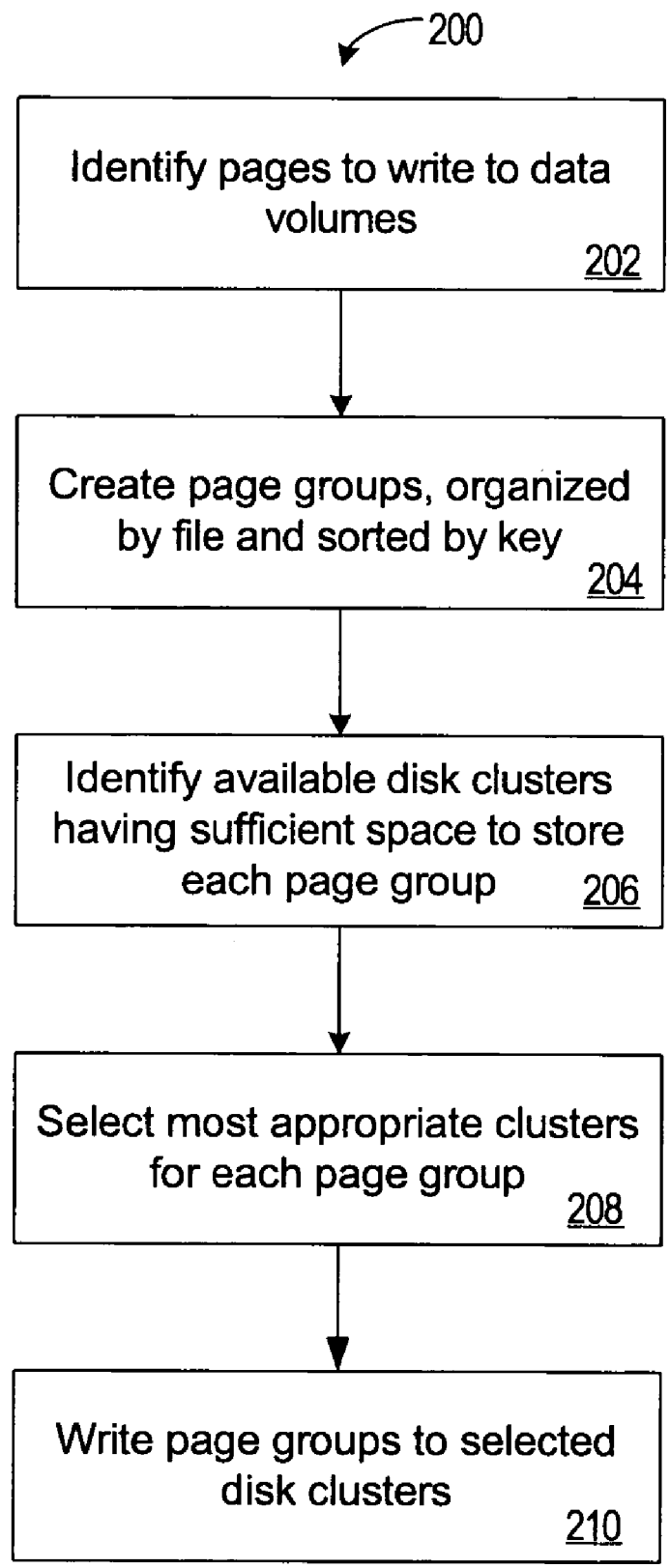
FIG. 2 is a flow diagram of a method according to some embodiments.

Reference is now made to FIG. 2, where a process 200 is shown for writing data to data volumes 116. The process depicted in FIG. 2 (and other processes described herein) does not imply a fixed order to the process steps, and embodiments of the present invention may be performed in any order that is practicable. Process 200 may be performed using code implemented on database server 104.

Process 200 may be triggered or started each time data cache 112 is flushed (or each time modified pages held in data cache 112 are to be committed to data volumes 116). For example, in some database systems, the data cache may be flushed every few minutes or any time the number or size of the pages in the cache exceeds a predetermined threshold. As such, process 200 may be repeated frequently.

Process 200 begins at 202 with the identification of the pages that are to be written to data volumes 116. For example, each of the pages in data cache 112 may be identified by information including its page ID, file ID, and primary key(s). This information may be, for example, stored in a header of each of the pages.

Processing continues at 204 where each of the pages in data cache 112 are grouped and sorted. More particularly, in some embodiments, pages associated with the same file are grouped together and then sorted by their primary key in ascending order. Once grouped and sorted, processing continues at 206 where the system identifies available disk clusters on data volumes 116 which have sufficient space to store each page group. For example, the size of each page group may be compared to information in a table or list of available disk clusters. In some embodiments, processing at 206 is configured to locate a contiguous area of free space that is large enough to save the sorted page group. In this manner, the pages may be read from data volumes 116 efficiently and with a reduced number of disk seeks.

In some embodiments, processing may continue at 208 where each page group is matched with the most appropriate available clusters. For example, processing at 208 may include identifying the available clusters that most closely match the size of the page group to be written. For example, if a page group is 24 k bytes in size, and if processing at 206 identifies two available clusters that are at least as large as the page group (e.g., including a cluster having 32 k bytes of free space, and a cluster having 40 kbytes of space), the cluster most closely matched in size to the page group will be selected. Processing at 208 may include other considerations as well to match the most appropriate cluster with each page group, e.g., to maximize disk storage space, reduce the number of unused small clusters, etc.

Processing continues at 210 where the page groups are written to the selected disk clusters on data volumes 116. Processing at 210 may also include updating the list of available clusters to reflect the unavailability of the selected clusters. Processing at 210 may represent the completion of a data cache flush operation and the copies of the pages stored in data cache 112 may be made available for other use (e.g., by being marked as available). In this manner, the pages in the data cache may be reused or replaced with another page from the data area.

Reference is now made to FIG. 3, where an illustration of aspects of process 200 is depicted. The simplified identifiers, keys and formats are used solely for illustration. Those skilled in the art will appreciate that actual pages in a database system will have identifiers, headers, etc. allowing a large number of pages to be manipulated and identified.

FIG. 3A illustrates a number of pages 302a-g modified and currently stored in data cache 112. For example, FIG. 3A may represent the state of an illustrative data cache 112 at step 202 of the process 200 of FIG. 2. Data cache 112 holds a number of pages 302a-g in an unsorted sequence (which, for example, may be more or less random due to the use of a hashing algorithm in the data cache). For example, page 302a is the first page modified by the system (since the last cache flush operation). Page 302g is the most recent page modified by the system (and the last page to be modified before the cache flush operation starts).

FIG. 3B illustrates the organization of the data pages after the pages have been grouped and sorted pursuant to the present invention (e.g., after completion of step 206 of the process of FIG. 2). In the illustrated example, the pages are associated with two different files (file "A" and file "B") and, accordingly, are grouped in two groups 304a and 304b. Each page is also sorted in ascending key sequence order (e.g., in group 304a, the page identified by page ID "7777" is the first page in the sequence).

Figure 4:
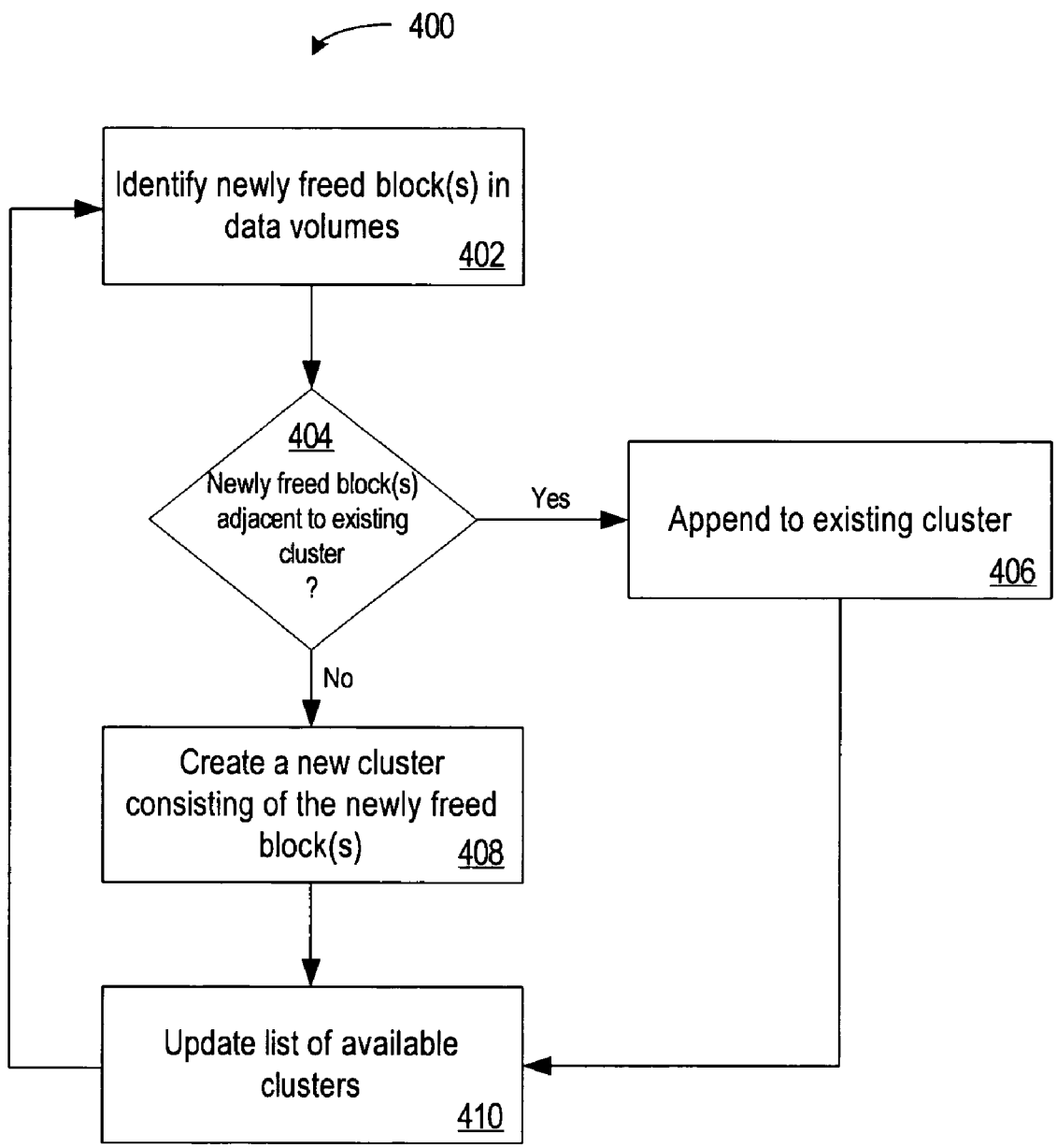
FIG. 4 is a flow diagram of a further method according to some embodiments.

Reference is now made to FIG. 4 where a further process 400 pursuant to some embodiments is shown. Process 400 may be performed under control of a database server such as the server 104 of FIG. 1 to track and catalog available data areas in data volumes 116. As discussed above, embodiments write data to available data areas in data volumes 116 based, in part, on the size of available clusters. Process 400 may be used to identify data areas that become available for storage and to add available data areas to existing clusters if possible. In this manner, embodiments ensure that data storage areas are efficiently managed and creates larger clusters of available data areas.

Process 400 begins at 402 where the code identifies newly freed block(s) in data volumes 116. For example, a block may become available for use if the page previously occupying the block is modified or rewritten to another area (and if the block no longer needs to store the "last known good page"). For example, a block may be identified as free if converter table 114 indicates the block is no longer in use.

Once a newly freed block is identified, processing continues at 404 where a determination is made whether the newly freed block is adjacent to an existing cluster of free blocks. For example, processing at 404 may include checking the status of the blocks immediately to either side of the newly freed block to determine if the newly freed block can be combined with an existing cluster of free space. If so, the newly freed block is appended to the existing cluster (creating a new, larger, cluster) at 406 (consisting of the newly freed block(s) and the original cluster adjacent to the newly freed block(s)). Processing continues at 410 where converter table 114 is updated to identify the new cluster (including an identification of the size and location of the new cluster). In this manner, embodiments avoid fragmentation of data volumes 116 and increase the size of clusters, thereby providing larger areas for writing data from the cache (and allowing larger sorted page groups to be written to contiguous areas in the data volumes).

If, however, processing at 404 indicates that the newly freed block(s) are not adjacent to any existing cluster of free blocks, processing continues at 408 where a new cluster is created (consisting only of the newly freed block(s)). Processing continues at 410 where converter table 114 is updated to identify the newly created cluster (including information identifying the size and location of the new cluster). The process 400 of FIG. 4 continually repeats as newly freed block(s) are identified.

Figure 5:
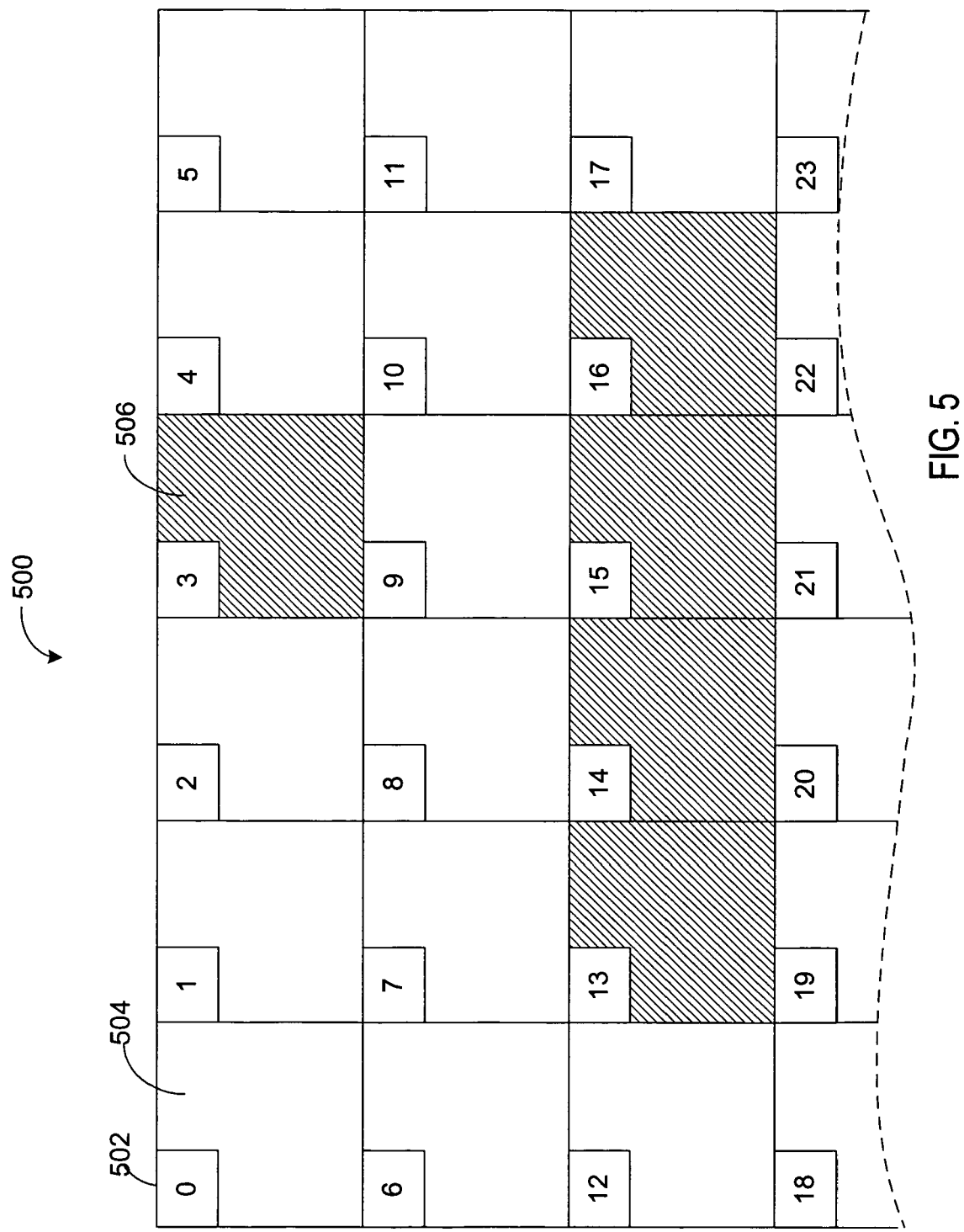
FIG. 5 is an illustration of a portion of a data volume according to some embodiments.

Referring now to FIG. 5, an illustration of a portion of a data volume 116 is shown to illustrate the process 400 of FIG. 4. Those skilled in the art will appreciate that the diagram of FIG. 5 is for illustration only, and that actual data volumes will have more detailed information associated with each data block (including header, trailer and other information).

In the illustration of FIG. 5, a data area 500 including a number of data blocks 504 is depicted (numbered 1 through 23). An address or other identifier 502 identifies each block. Information identifying the status of each block may be stored in, for example, the converter table 114 of FIG. 1. For example, a block may be designated as available or unavailable. In the illustration, block numbers 3, and 13-16 are shown as being available (and the other blocks are unavailable or in use). Pursuant to some embodiments, available blocks are identified by cluster. As an example, block 3 may be identified as one cluster, and blocks 13-16 as another cluster.

As discussed above in conjunction with FIG. 4, the status of each block is monitored to identify newly freed blocks and to determine whether to add newly freed blocks to existing clusters if possible, or to create a new cluster. Some examples will now be provided by referring to FIG. 5. Assume that block 12 becomes available. Because the block is adjacent to an existing cluster of free blocks, block 12 will be added to the cluster originally consisting of blocks 13-16, creating a new cluster comprised of blocks 12-16. Information identifying this cluster will be updated in converter table 114 (including the size and location of the cluster). As another example, assume that block 8 becomes free. Because there are no existing clusters adjacent to block 8, a new cluster will be created consisting solely of block 8. Information identifying this new cluster will be updated in converter table 114 (including information identifying the size and location of the new cluster).

In this manner, read performance is improved (particularly for large table scans). Logically connected pages are kept together in the same area or "cluster" of the data volumes 116. Desirable write performance is also obtained by not requiring any fixed assignment of table pages (e.g., pages are distributed over all of the volumes, so long as chunks of adjacent pages are written to the same cluster or area).

Although the present invention has been described above with respect to some embodiments thereof, it should be noted that the above-described embodiments may be altered to create completely or partially different embodiments without departing from the spirit and scope of the appended claims. For example, some embodiments herein may be implemented, at least in part, by a medium storing processor-executable instructions, the instructions including instructions to identify a plurality of data pages in a data cache to be written to a data volume, each data page including a file identifier and a key; instructions to create a first page group from the plurality of data pages, the first page group including data pages associated with a first file as identified by the file identifier and sorted by the key; instructions to identify a size of the first page group; and instructions to write the first page group from the data cache to available disk clusters of the data volume based on the size of the first page group, wherein the first page group is not written to a pre- assigned data volume area.

What is claimed is:

1. A computer implemented method, comprising:
    identifying a plurality of data pages in a data cache to be written to a data volume, each data page including a file identifier and a key;
    creating a first page group from said plurality of data pages, said first page group including pages associated with a first file as identified by said file identifier and sorted by said key;
    identifying a size of said first page group; and
    writing said first page group from said data cache to available disk clusters of said data volume based on the size of said first page group, wherein said first page group is not written to a pre- assigned data volume area.

2. The method of claim 1, further comprising:
    creating at least a second page group from said plurality of data pages of pages associated with a second file as identified by said file identifier and sorted by said key; and
    writing said second page group from said data cache to available disk clusters of said data volume, wherein said second page group is not written to a pre-assigned volume area.

3. The method of claim 1, wherein said identifying a plurality of data pages is performed in response to a data cache flush operation.

4. The method of claim 2, further comprising:
    updating a list of available data blocks on said data volume after said writing.

5. The method of claim 4, wherein said list of available data blocks includes information identifying clusters of neighboring data blocks.

6. The method of claim 1, wherein said file identifier is used to identify a database file associated with said data page.

7. The method of claim 1, wherein said key is a primary key identifying a database row associated with said data page.

8. A database system, comprising:
    a memory storing processor-executable instructions; and
    at least a first processor in communication with the memory and operative in conjunction with the stored instructions to:
        identify a plurality of data pages stored in a data cache and to be written to a data volume, each data page including a file identifier and a key;
        create a first page group from said plurality of data pages, said first page group including data pages associated with a first file as identified by said file identifier and sorted by said key;
        identify a size of said first page group; and
        write said first page group from said data cache to available disk clusters of said data volume based on the size of said first page group, wherein said first page group is not written to a pre- assigned data volume area.

9. The database system of claim 8, wherein said processor is further operative in conjunction with the stored process instructions to:
    create at least a second page group from said plurality of data pages, said second page group including data pages associated with a second file as identified by said file identifier and sorted by said key; and
    write said second page group from said data cache to available disk clusters of said data volume based on the size of said first page group, wherein said first page group is not written to a pre- assigned data volume area.

10. The database system of claim 8, wherein said processor is further operative in conjunction with the stored process instructions to:
    update a list of available data blocks on said data volume after said write, said list of available data blocks including information identifying clusters of neighboring data blocks.

11. A medium storing processor-executable instructions, the comprising:
    instructions to identify a plurality of data pages in a data cache to be written to a data volume, each data page including a file identifier and a key;
    instructions to create a first page group from said plurality of data pages, said first page group including data pages associated with a first file as identified by said file identifier and sorted by said key;
    instructions to identify a size of said first page group; and
    instructions to write said first page group from said data cache to available disk clusters of said data volume based on the size of said first page group, wherein said first page group is not written to a pre- assigned data volume area.

12. The medium of claim 11, further comprising instructions to consult a list of available data blocks on said data volume to identify a cluster of data blocks equal to or larger than the size of said first page group, wherein said writing includes writing first page group to said cluster.

* * * * *